INVENTOR.
SYDNEY FORBES
BY Chisholm & Spencer
ATTORNEY

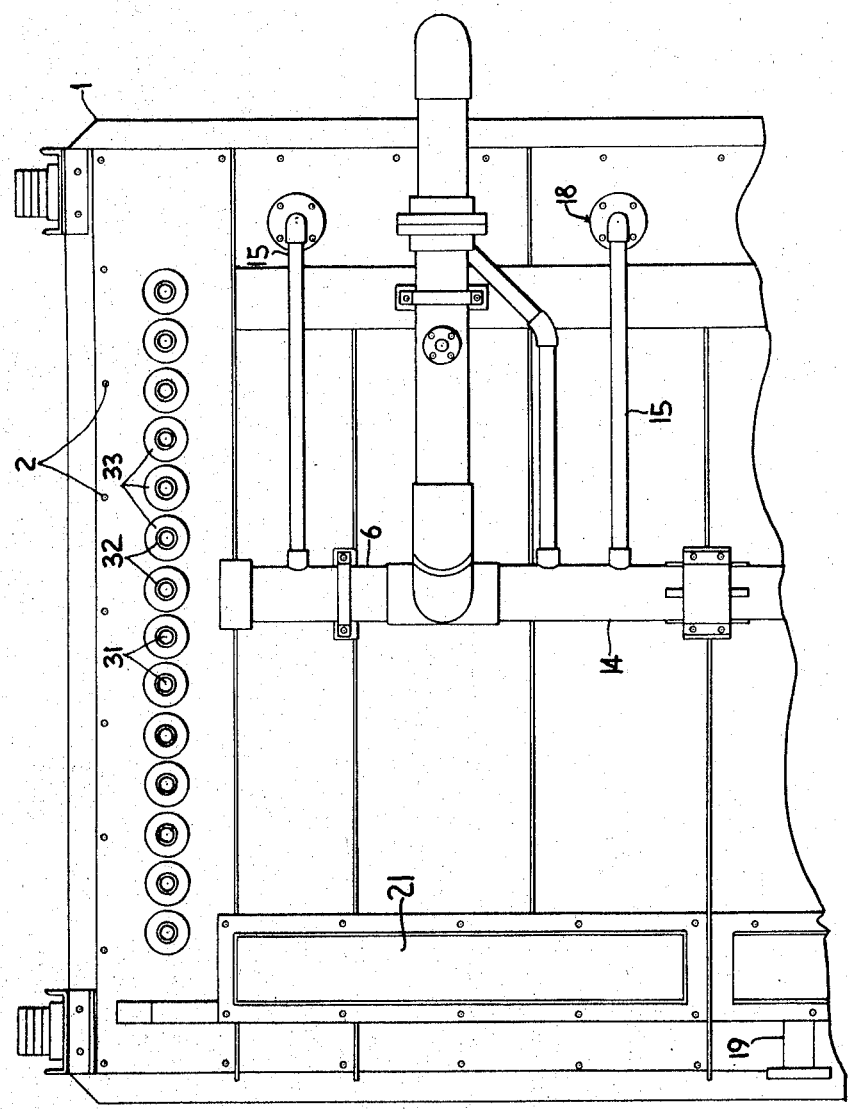

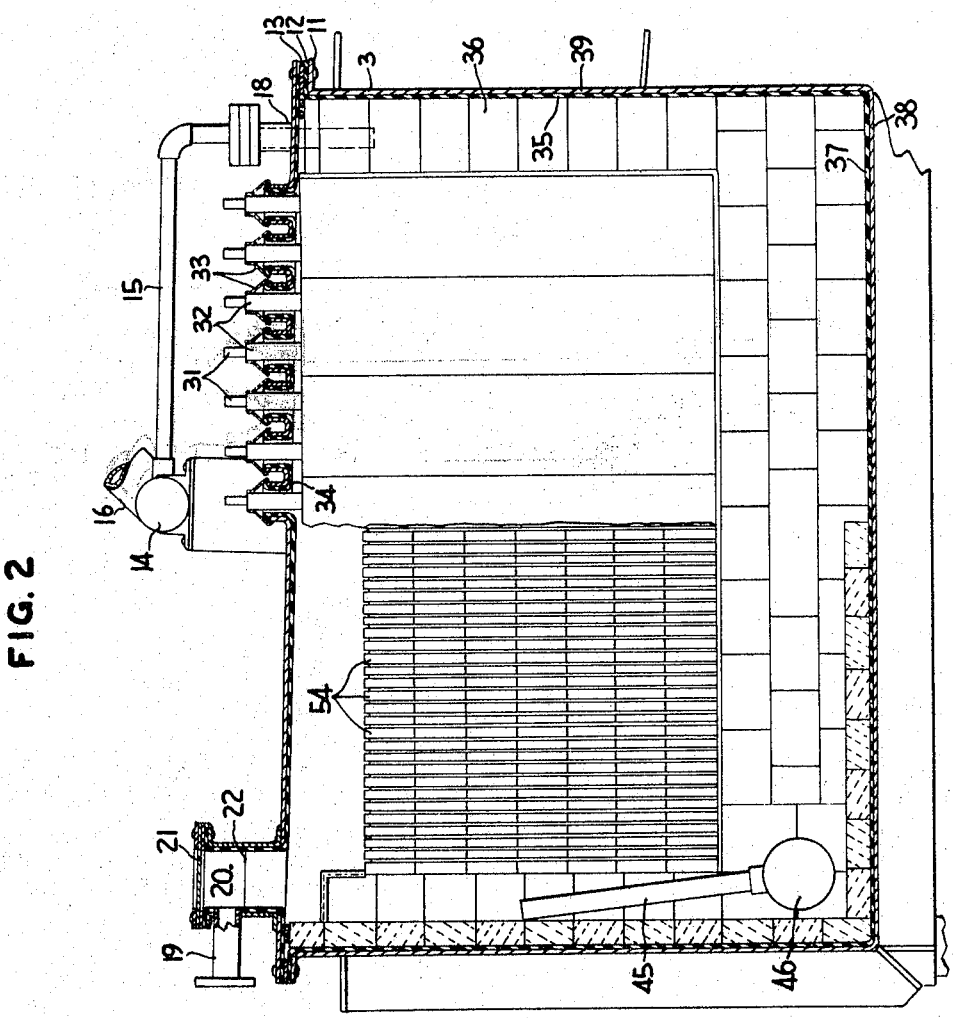

United States Patent Office 3,298,946
Patented Jan. 17, 1967

3,298,946
ELECTROLYTIC BIPOLAR ALKALI
CHLORATE CELL
Sydney Forbes, Pittsburgh, Pa., assignor to Pittsburgh Plate Glass Company, Pittsburgh, Pa., a corporation of Pennsylvania
Original application Mar. 30, 1962, Ser. No. 183,974, now Patent No. 3,203,882, dated Aug. 31, 1965. Divided and this application Nov. 3, 1964, Ser. No. 408,615
3 Claims. (Cl. 204—268)

This is a division of U.S. Serial No. 183,974, now U.S. Patent 3,203,882, filed March 30, 1962.

The present invention relates to chlorate cells. More particularly, the present invention relates to a novel electrolytic bipolar chlorate cell suitable for use in the manufacture of alkali metal chlorate from alkali metal chloride solutions. Still more particularly, the present invention relates to a novel apparatus for safely conducting the electrolysis of alkali metal chlorides to produce alkali metal chlorates.

For a complete understanding of the present invention, reference is made to the accompanying drawing in which:

FIGURE 1 is a plan view of the top of the novel chlorate cell of the present invention shown the positioning of the current distributors, hydrogen outlets and brine feed inlets.

FIGURE 2 is a side elevation partly in section of the cell shown in FIGURE 3 and taken along lines II—II of FIGURE 3.

Figure 3:
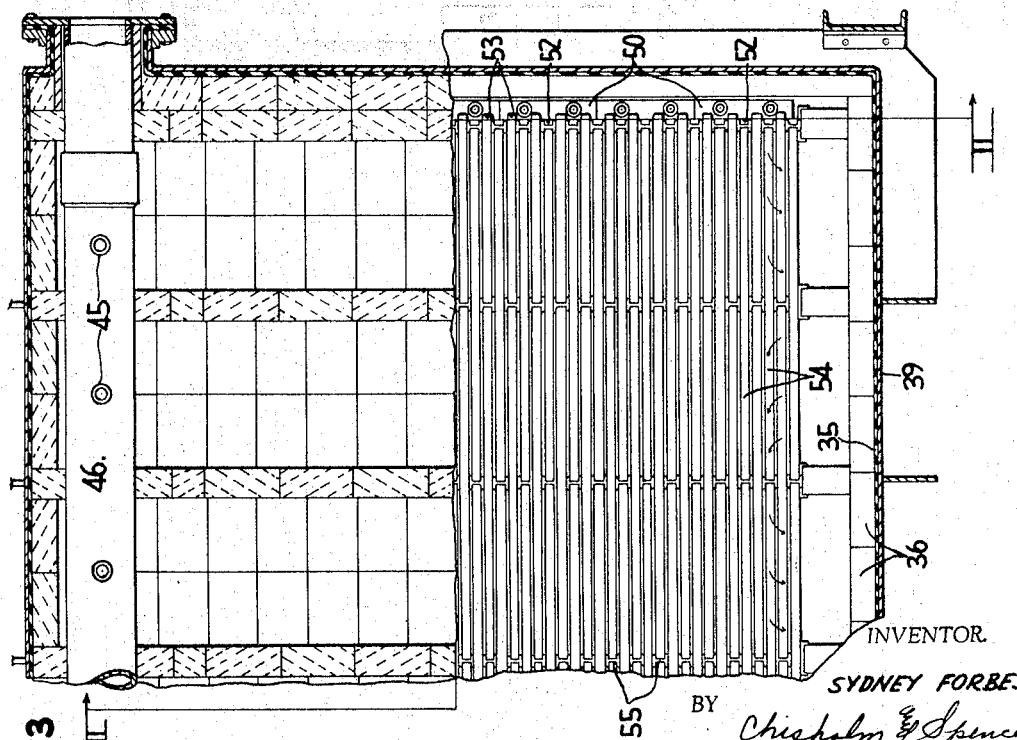
FIGURE 3 is a plan view partly in section of the cell shown in FIGURE 4 with the cover removed to show the electrodes and with the electrodes partly removed to show the bottom construction of the cell.

Turning in particular to FIGURES 1, 2, and 3, there is shown a cover member 1. The cover member of the cell is bolted to the side 3 by a plurality of bolts 2 which traverse a flange member 11 affixed to or formed as an integral part of the side member 3. Between the cover member 1 and the flange member 11 is a rubber lining 12 and an asbestos gasket 13 to prevent leakage from the side of the cell. Located slightly above the upper surface of the cover member 1 of the cell is a brine header 14. A plurality of feed pipes 15 are integrally connected to the header 14 and these feed pipes terminate in downward extensions which traverse the cell cover and end as an open tube a short distance below the liquid level contained in the cell. Preferably, these feed pipes 15 terminate at a level below the surface of the brine contained in the cell of about 6 to 10 inches. The header 14 is fed from a duct 16 which normally is connected to a retention tank (not shown), and which is located at a point some distance from the cell.

The admission of brine to the cell is readily accomplished by suitable conventional pumping mechanisms not shown in the cell drawing. The admission of brine to the cell at the various points therein may be readily regulated by regulating the orifice size of the opening at the downward extension of the feed pipe 15. Thus, where desired, feed rates to any one unit within the cell box may be regulated by providing a larger or smaller orifice on this feed pipe to thereby regulate fluid flow into this portion of the cell.

Located preferably on the opposite end of the cell from the inlet openings 18 for the brine feed are a plurality of hydrogen outlets 19 which are in communication with a gas collection zone 20 having a reduced cross sectional area in relation to the cross sectional area in the cell in which it is located. This gas collection zone 20 has a cover member 21 located thereon and this is preferably constructed of a polyvinyl chloride or other similar acid resistant plastic material which is easily fractured and also transparent. In the operation of the cell this gas zone of reduced cross sectional area is partially filled with liquid depicted as a level 22 in FIGURE 2 so that a gas collection zone of very small cubic dimension is provided underneath the cover of the cell. Thus, in the event of an explosive range build up of oxygen in the hydrogen produced in the cell, any explosion will be dissipated by rupture of the window 21 in the confined gas zone 20. The small cubic area present in zone 20 and the easily rupturable window thereby considerably minimize the effects of any hazardous accumulation of oxygen in the hydrogen outlets of the cell.

Drawing attention particularly to FIGURE 2, a plurality of anode connectors or current distribution rods for the electrodes of the cell 31 are shown. These rod members 31 are held in place by a collar member 32, preferably constructed of graphite which in turn is held in place with relationship to the cover of the cell by a clamping member 33. A rubber lining 34 is located beneath the cover surface 1. The entire interior surface of the cell, that is, the sides and the bottom, is lined with various materials to prevent corrosive attack at these brine exposed surfaces. Thus, the side of the cell 39 is lined by a rubber lining 35 which in turn has affixed to the inside surface thereof brick members 36. These bricks are preferably constructed of acid resistant ceramic materials. Similarly, the bottom of the cell has a rubber lining 37 affixed thereto and this rubber lining has several layers of brick overlying it. The rubber lining protects the steel surface of the bottom of the cell 38 from corrosive attack during electrolysis. Similarly, the rubber lining 35 protects the side members 39 from corrosive attack during electrolysis. The bricks are placed against the rubber lining to prevent serious corrosive attack of the rubber lining during electrolysis by providing a rather tight interface between the rubber and the surface of the brick. In actual operation when fluid leaks through the brick and begins attacking the rubber surface the tight physical connection between the brick and the rubber lining prevents an accumulative deterioration of the rubber lining and ultimately protects the steel from corrosion.

Figure 4:
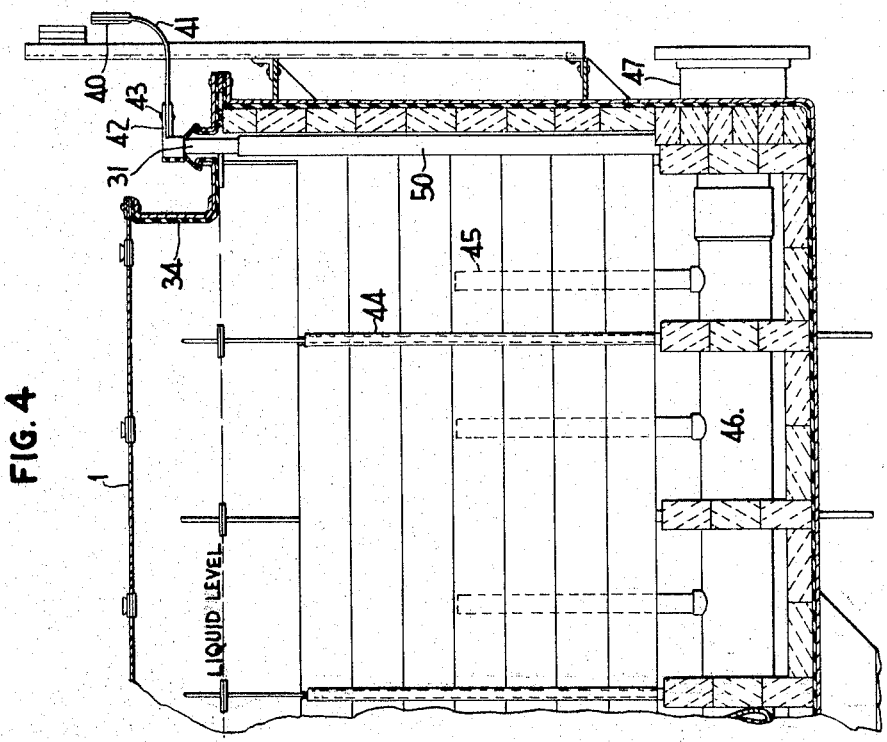
FIGURE 4 is an end view of the cell partly in section showing the busbar connection to the cell and the liquid produced discharge eduction pipes.

As shown in FIGURE 4, busbars 40, used to supply current to the cell of the instant invention, are connected through electrical connectors 41 to the anodes of the cell through the current anode distribution rods 31 by an electrical clamping member 42. The busbars 40, electrical connectors 41 and clamping member 42 are preferably constructed of copper and the connectors 41 are bolted to the clamping members 42 with copper bolts 43.

Further, as shown in FIGURE 4 in the bottom portion of the cells, a plurality of spacing members 44 are shown which effectively divide the cell into individual units, each unit having a plurality of electrodes located therein. The circulation of brine in the cell is thus preferably on a unit-to-unit basis, thus being accomplished by virtue of the spacing members 44. Located in the bottom of each cell unit is an educator pipe 45 which removes the liquid products of electrolysis to a common header 46 located in the bottom of the cell. The header 46 has a discharge conduit 47 connected thereto on the outside portion of the cell and material removed from the cell through this conduit is fed to a retention tank where it is held for a period of time sufficient to convert the hypochlorous acid contained therein to alkali metal chlorates by a chemical mechanism well understood in the art. A portion of the material contained in the retention tanks as has previously been explained is returned to the cell along with makeup alkali metal chloride solution for further electrolysis. This portion of the operation of the chlorate cell is not shown in the drawings since it has no relationship to the novel method of operating these cells or to their construction.

Turning to FIGURE 2, it is to be noted that the cell is so constructed that the top member 1 slopes from the gas collection zone 20 to the brine inlet opening 18. The particular pitch of the slope is not of particular consequence, though preferably an incline providing a drop in a vertical direction of about ¼ inch per running foot or more is preferred. The sloping top permits the collection of gas bubbles on the undersurface of the cover member 1 at the rubber lining 12 and assists in transporting these gas bubbles as they collect at this surface to the gas collection zone of reduced cross sectional area 20.

The electrode current distribution rods 31 and their connection to the end blocks 50 of the cell are shown more distinctly in FIGURE 3. In this figure there is shown the current distribution rod 31 positioned within a graphite collar 32. The graphite collar 32 is externally threaded and adapted to be received into an internally threaded graphite end block. The internal threading in the graphite end block is located on the upper end of two bored holes located in the end block and traversing the end block along its long axis. The bored holes terminate slightly above the lower surface of the end blocks. The current distribution rods 31 are positioned inside of the collar and are held in place therein and in the end block by tamping amalgam between the outer surface of the rods 31 and the inner surface of the collar 32 and the bored holes. The lateral surface 52 of the end block 50 is machined on its long axis to provide four elongated channels 53. These channels are constructed and adapted to receive one end of the electrodes 54 utilized in the cell and are sufficiently long to provide for the insertion of at least seven anode blades of conventional dimension one above the other.

As shown in FIGURE 3, the electrical current is passed through the cell by introducing current through rods 31 to the end blocks 50. The current passes from the end block 50 into the inserted end of the electrodes 54. The electrodes 54 operate in a bipolar fashion so that current passes from one end of the electrode to the other and from here is distributed across the electrolyte to the next adjacent electrode which then becomes an anode and carries current to the next adjacent electrode. The electrodes are separated one from the other by virtue of non-conducting H spacers 55 located between them. Thus, in operation of the cell current will travel from electrode to electrode as depicted by the small arrows shown in FIGURE 3. Current distribution rods such as those shown in the drawing are also located on the other end of the cell which is not shown in FIGURE 3. These distribution rods are located in end blocks in exactly the same fashion as those shown in the drawing and at this point current is removed from the cell by passing through the electrodes into the end block and from the end block into the distribution rods and from there to the bus system.

In the operation of a cell of this character, because of the physical relationship of the current distribution end blocks to the first cell unit contained in the cell and the last cell unit contained in the cell, considerably more heat is evolved in the first and last physical units formed by the spacing members 44 within the cell. Since this heat of the electrolyte considerably influences the rate of electrolysis in a given cell unit, brine feed rates to the first and last units of the cell are usually slightly higher than those to the intermediate cells located between the first and last cells. This may be readily accomplished, as previously explained, by regulating the brine orifices feeding the first and last cell units. Usually, this feed rate is such that brine fed to the first and last unit in the cell is at least 20 percent greater than the rate of that utilized in feeding intermediate cells. This is an important consideration in the operation of a cell of this character since if possible, even anode wear from one end of the cell to the other is the most desirable condition for proper and economical electrolysis. Uniform temperatures throughout the cell help achieve this uniform wear. If desired, current may be reversed in the cell from one end to the other periodically to provide for more even wear of the electrodes during electrolysis. Even wear of the electrodes during electrolysis provides a uniform electrode gap across the electrolyte contained within the cell and considerably reduces any large voltage fluctuations which normally result when large electrode gaps are encountered in this type of cell.

The electrode materials employed in a cell of this type are normally graphite and graphite electrodes form the preferred embodiment of the instant cell. While graphite is preferably employed, it is of course to be understood that other electrode materials capable of withstanding the corrosive conditions existing within the electrolyte may also be employed if desired. Thus, certain base metals such as titanium and tantalum may be utilized as electrodes when they are provided with a suitable platinum surface on which the electrolysis may take place. In addition, various combinations of electrode materials may be employed where desired. Thus, if desired, platinum plated or coated titanium or tantalum may be employed as anodes and these anodes provided at one end with an integral steel cathode so that the entire structure along the electrical path of the cell operates as an anode at one end and a cathode at the other. The end blocks 50 of the cell are preferably constructed of graphite, usually a corrosion resistant dense graphite material such as karbate. While this is preferred, it is of course to be understood that machined steel may also be employed or any other electrically conductive metal which can be readily bored and machined to provide the necessary holes and channels for the electrical connecting rods 31 and the electrodes 54. In this latter case, care must be taken to provide for suitable corrosion resistant lining on those surfaces of the end block which are exposed to brine when placed in the cell.

In the operation of a cell such as shown in FIGURES 1–4 the cell is filled to a point such that the electrodes are covered with brine and the brine level in the cell is at least partially contained in the restricted gas collection zone 20. Electric current is passed through the cell via the connectors 31, end blocks 50, electrodes 54 and out the other side of the cell. During electrolysis, brine is fed to the cell through header 14 and feed pipes 15 to all of the cell units formed by the spacers 44. The first and last units in the cell, that is, the units adjacent to the electrical distribution system have the orifices in their feed pipes 15 adjusted to provide a brine flow 20 percent greater than the other units in the cell. During electrolysis, hydrogen released in the cell is caused to collect under the cover of the cell in the brine. The collected gas bubbles are then transported across the cover by virtue of its upward slope to the restricted gas collection zone where it is removed from the cell. Operating the cell in this manner, uniform temperatures are readily provided during electrolysis. In addition, the gaseous hydrogen is rapidly collected and removed from the cell.

While this invention has been described with reference to certain specific embodiments, it is of course to be understood that the invention is not to be so limited except insofar as appears in the accompanying claims.

What is claimed is:

1. An electrolytic alkali metal chlorate cell comprising an enclosed box, a plurality of bipolar electrodes in said box constructed and arranged to electrolyze brine in said box, means to pass current through said box and across said electrodes, an inclined cover member on said box, a gas collection zone located beneath said cover at the upper end of the inclined surface, said gas collection zone being restricted in size and provided at the cover surface with a rupturable disc, and means to pass electrolyte into said cell and remove the liquid products of electrolysis therefrom.

2. Apparatus of claim 1 wherein said disc is constructed of polyvinyl chloride.

3. An electrolytic alkali metal chlorate cell comprising an enclosed box having a plurality of elongated end blocks located at one end therein and extending from the top of the cell to a point slightly above the bottom, said end blocks being provided on their upper surface with two bored holes which traverse the end blocks to a point slightly above the base thereof, conductor rods in said holes, a plurality of channels located on the lateral surface of said end blocks and having a plurality of electrodes inserted therein, a plurality of end blocks of similar construction located on the opposite end of said box, means for introducing electrical current into said box and removing current therefrom at the opposite end of said box, a cover member on said box having a sloping surface, said sloped surface terminating in its upward direction in a confined gas zone, said gas zone being provided on its upper surface with a rupturable transparent disc and being provided with a gas discharge opening and means for introducing brine to be electrolyzed into said cell at a point in cell opposite said confined gas zone.

References Cited by the Examiner
UNITED STATES PATENTS

| | | | |
|---|---|---|---|
| 1,092,369 | 4/1914 | Kolsky | 204—95 |
| 1,837,519 | 12/1931 | Bleecker | 204—268 |
| 1,994,125 | 3/1935 | Eck | 204—278 |
| 2,468,022 | 4/1949 | Blue et al. | 204—244 |
| 2,799,643 | 7/1957 | Raetzsch | 204—270 |

JOHN H. MACK, *Primary Examiner.*

E. ZAGARELLA, *Assistant Examiner.*